United States Patent

Sawada et al.

[11] Patent Number: 5,840,395
[45] Date of Patent: Nov. 24, 1998

[54] OPTICAL INFORMATION RECORDING MEDIUM AND METHOD FOR PRODUCING SAME

[75] Inventors: Kazumi Sawada, Shizuoka; Yoshihiro Shigemori, Saitama, both of Japan

[73] Assignee: Sony Disc Technology, Inc., Kanagawa, Japan

[21] Appl. No.: 666,481

[22] PCT Filed: Oct. 25, 1995

[86] PCT No.: PCT/JP95/02190

§ 371 Date: Sep. 12, 1996

§ 102(e) Date: Sep. 12, 1996

[87] PCT Pub. No.: WO96/13834

PCT Pub. Date: May 9, 1996

[30] Foreign Application Priority Data

Oct. 27, 1994 [JP] Japan ................................. 6-264282

[51] Int. Cl.$^6$ ..................................................... B32B 3/00
[52] U.S. Cl. ....................... 428/64.1; 428/64.2; 428/64.4; 428/64.7; 428/64.8; 428/913; 369/288
[58] Field of Search ................................. 428/64.1, 64.2, 428/64.4, 64.7, 64.8, 913; 369/272, 273, 280, 288, 292; 425/543

[56] References Cited

U.S. PATENT DOCUMENTS 5,190,800  3/1993  Takashi et al. .......................... 428/64.1

FOREIGN PATENT DOCUMENTS

| 0 438 225 A1 | 7/1991 | European Pat. Off. . |
| 59-118132 | 8/1984 | Japan . |
| 3-214438 | 9/1991 | Japan . |
| WO 91/13434 A | 9/1991 | WIPO . |

*Primary Examiner*—William Krynski
*Assistant Examiner*—Elizabeth Evans
*Attorney, Agent, or Firm*—Frommer Lawrence & Haug LLP; William S. Frommer

[57] ABSTRACT

The present invention is relative to an optical information recording medium having a reflective layer for reading out information signals by an optical technique. The optical information recording medium is formed as a plastic substrate. According to the present invention, the substrate is colored by admixture of a dyestuff for enabling instant judgment by the visual sense of the operator as to the contents of the optical information recording medium, for example, as to if the contents of the recording medium is a game program or the music information. If impurities such as dyestuffs are admixed, the optical system of the readout device is usually affected thus raising readout difficulties. Such ill effects on the optical system may be eliminated by setting the particle size of the dyestuff so as to be 50 $\mu$m or less.

5 Claims, 1 Drawing Sheet

OPTICAL INFORMATION RECORDING MEDIUM AND METHOD FOR PRODUCING SAME

TECHNICAL FIELD

This invention relates to an information recording medium for optically reading out information signals by laser light. More particularly, it relates to an optical information recording medium which is colored for enabling the sort or application thereof to be instantly determined on visual check.

BACKGROUND ART

Among so-called compact discs, those discs having audio signals digitally recorded thereon have so far been predominant. Recently, so-called CD-ROMs having computer programs or data recorded thereon, have been developed, thus increasing the number of sorts and the field of application of the compact discs.

With increase in the number of sorts and the usage of the compact discs, demand has been raised for providing the CD with some discrimination means. For example, if different colors are afforded to the CD according to the sorts and the usage, it may be expected that the user is able to discriminate the CD instantly.

For affording color to the CD, the simplest and easiest method is to color a plastic substrate itself with coloring matter.

Among the methods for coloring plastics, there is known a method of preparing a coloring compound and subsequently producing a colored molded article by a molding device. There are also known other methods, such as a method consisting in mixing powdered coloring agents termed a dry color with an non-colored resin (dry blend method) and in dispersing the resulting mixture by a molding device for preparing a colored molded article, a method consisting in diluting a coloring agent, obtained on dispersing high-density dyestuff or pigments, termed a master batch, with a non-colored resin, and employing the resulting diluted coloring agents for coloring, and a method, termed a liquid coloring method, consisting in dispersing a dyestuff and the pigment in a liquid vehicle and supplying the resulting paste-like coloring agent in metered quantities using a pump.

In general, the dyestuff is readily dissolved in plastics and superior in dispersibility. Thus a satisfactory colored molded article may be obtained by the dry blend method with the use of commercial dyestuffs.

However, since not only the appearance but also a variety of optical properties are required of CDs, simple application of the above methods is not sufficient to give satisfactory results.

It is therefore an object of the present invention to provide an optical information recording medium which is colored to enable the sorts and the usage etc. to be discriminated instantly and which has superior optical properties. It is also an object of the present invention to provide a method for producing such optical information recording medium.

DISCLOSURE OF THE INVENTION

For accomplishing the above objects, the present inventors have long conducted a variety of investigations, and thus arrived at a conclusion that the particle size of the coloring matter mixed into the plastic substrate significantly influences the error rate at the time of reproducing data from the optical information recording medium.

The present invention has been completed based on this information. That is, the present invention provides an optical information recording medium including a plastic substrate colored by admixture of the coloring matter and a signal recording portion from which information signals are optically read out, wherein the particles of the coloring matter admixed into the plastic substrate are not more than 50 $\mu$m in size.

The present invention also provides a method for producing an optical information recording medium including the steps of dispersing the coloring matter in a dispersion medium to produce the liquid coloring matter, passing the liquid coloring matter through a filter for removing coarse particles therefrom for preparing the liquid coloring matter with the maximum particle size of the pigments being not more than 50 $\mu$m, and supplying the liquid coloring matter into a resin injection hopper of an injection molding device for injection molding a plastic substrate.

Among basic properties desired of the coloring matter, such as dyestuffs, employed for coloring plastic substrates in the present invention, is the capability of withstanding the molding temperature for polycarbonate, as a material of the plastic substrate, and of achieving desired coloring. Most important is complete dissolution and dispersion of the dyestuff in the polycarbonate. However, the dyestuff is sometimes left as solid particles, depending upon the sorts of the dyestuff. If these solid particles are present, various inconveniences arise in connection with the performance of the CD, such as increased error rate.

The present inventors have conducted various investigations for solving the above problems and found that the above inconveniences arise if the particle size of the solid particles of the dyestuff present in the polycarbonate is large. The present inventors have conducted various searches for solving the problem.

These methods include:

(1) A method of accelerating dissolution of the dyestuff by strengthening the kneading by the injection molding device in case of dry-blending the usual dyestuff with polycarbonate and molding the resulting mass;

(2) a method of preparing a colored compound with an extruder and molding the resulting colored compound; and (3) a method of preparing a master batch of the dyestuff and molding the master batch.

The performance of the CD, obtained by the above method, is not sufficient, even if it is slightly improved over that of the CD obtained on simply blending the dry color. The possible reason is that, with the above method (1), contamination due to the scattered dry color is produced. The major inconvenience is that productivity and economic merit are lowered due to strengthened kneading.

With the method (2), an increased molecular weight of the polycarbonate tends to affect characteristics and tends to increase the rate of rejects due to contamination. With the method (3), there is raised the problem of fluctuated dilution of the master batch and contamination.

The present inventors have conducted investigations into a method of preparing a past-like coloring matter by dispersing the dyestuff in the liquid vehicle for injecting the resulting coloring matter into a lower portion of a molding device for molding.

With this investigated method, several sorts of the dyestuffs were dispersed into a vehicle by three rolls and used in the form of a paste. The reject rate of the CDs molded by this method was about 90%, which is not an acceptable value. The possible reason is that part of the dyestuff in the coloring matter was not fully dissolved and left in polycarbonate as defects which were 100 μm or larger in size and which were comprised of coarse particles as nuclei with the exclusion of semi-dissolved surrounding portions.

For solving this deficiency, the coloring matter was formed from dispersed particles of the dyestuff 40 μm or less in size and CDs were molded in a similar manner for checking the reject rate. The reject rate was found to be not higher than 5%. The present invention has been arrived at based upon these results.

Meanwhile, the particle size of the dyestuff in the coloring matter, required in accordance with the present invention differs with the sorts of the dyestuff. The possible contributing factors are solubility (compatibility) of the dyestuff with respect to the polycarbonate and the melting point of the dyestuff. For example, with Solvent R.135, a perinon-based dye, adaptability to the properties of the CDs can hardly be obtained. The possible reason is that satisfactory dispersion has not been achieved since the dyestuff has the melting point as high as 307° C. substantially close to or higher than the molding temperature of polycarbonate. In any case, a method is preferably employed in which solid particles of the dyestuff are not present or at least the particle size of the solid particles is not more than 50 μm in the polycarbonate substrate of the molded CD.

According to the present invention, optional coloring matters, such as dyestuffs or pigments, may be employed. Practically, dyestuffs are preferred. Among the dyestuffs that may be employed include anthraquinone, heterocyclic, methine, pelynon, pelylene or thio-indigo based dyestuffs. If, in addition to the above properties, account is taken of sublimability possibly causing contamination to the metal mold, the anthraquinone based dyestuffs may be enumerated by Solvent Red 52, Solvent Red 149, Solvent Blue 94 and Solvent Green 3. The heterocyclic based dyestuffs may be enumerated by Solvent Yellow 33, Solvent Yellow 54 and Solvent Yellow 105. The methine-based dyestuffs include Solvent Y93 and Solvent Orange 80. The pellynon-based dyestuffs may be enumerated by Solvent Orange 60 and Solvent Red 135. The pellylen-based dyestuffs may be enumerated by Solvent Green 5. Preferred thio-indigo-based dyestuffs include Vat Red 1. These may be used singly or in combination.

According to the present invention, the coloring matter, such as the above dyestuff, is preferably dispersed in vehicles so as to be used in the form of a liquid coloring matter. The vehicles employed include high-boiling organic solvents and plasticizers. The basic desirable properties as the vehicle include the capability of withstanding the molding temperature of approximately 300° to 350° C., the property of not causing the lowering of the molecular weight of the polycarbonate and the property of not affecting mechanical properties of the molded CDs, such as impact strength, thermal deformation temperature, cracking or bleeding, to say nothing of adaptability as the colorant, that is safety, dispersion stability of the dyestuff and meterabilty by a pump.

From the above reason, that is in view of availability, cost and various physical properties, the plasticizers are preferred. The vehicles may be used singly or in combination without any limitations.

The plasticizers, as an example, may be enumerated by phthalic acid ester based plasticizers, such as diisodecyl phthalate (DIDP) or tridecyl phthalate (DTDP), epoxy-based plasticizers, such as epoxylated soybean oil (ESO), 4,5-epoxy cyclohexane-1,2-dicarboxylic acid di-2-ethylhexyl (E-PS), 4,5-epoxy cyclohexane-1,2-diisodecyl (E-PE), glycidyl oleate, 9,10-epoxy stearic acid allyl, 9,10-epoxy stearic acid-2-ethylhexyl, epoxylated toll oil fatty acid-2-ethylhexyl and bisphenol A glycidyl ether, phosphoric acid ester based plasticizers, such as tributyl phosphate (TBP), triphetyl phosphate (TPP), toxyl dipjhenyl phosphate or tripropylene glycol phosphate, fatty acid ester based plasticizers, such as butyl stearate (BS), methyl acetyl ricinolate (MAR) or ethyl acetyl ricinolate (EAR), plasticizers, such as trioctyl trimellitate, trimellitic acid esters, dipentaerithrytol esters or pyromellitic acid esters, and polyester-based plasticizers, such as poly(propylene glycol, adipic acid) esters, poly(1, 3-butanediol, adipic acid) esters, poly(propylene glycol, sebacic acid) ester, poly(1,3-butanediol, sebacic acid) ester, poly(propylene glycol, phthalic acid)ester, poly(1,3-butanediol, adipic acid) ester, poly(ethylene glycol, adipic acid) ester or poly(1,6-hexanediol, adipic acid) ester.

Additives may also be effectively added for affording ease in dispersion and storage stability to the vehicle.

The present invention may be applied to any optical information recording medium for optically reading out information signals. For example, it may be applied to an optical disc in which pits in the form of recesses and lands are formed in a plastic substrate and a reflective layer is formed thereon as a signal recording portion, such as a CD or a CD-ROM.

Although the foregoing description has been made in connection with the use of polycarbonate as a material for the plastic substrate, any suitable plastic material other than polycarbonate may also be employed.

If, when coloring the plastic substrate of the optical information recording medium, such as CD, with the coloring matter, such as dyestuff, the particle size of the mixed coloring matter exceeds 50 μm, the resulting optical recording medium is deteriorated in optical characteristics, such that, when data is reproduced from the optical information recording medium, the error rate is increased. Conversely, if the particle size of the mixed coloring matter is not more than 50 μm, sufficient optical properties may be maintained, while it becomes possible to suppress the reject rate due to increased error rate.

According to the present invention, since the particle size of the dyestuff mixed into the plastic substrate is optimized, it becomes possible to achieve an optical information recording medium which is colored for assuring instant judgment of the sorts or usages thereof and which has satisfactory optical properties.

As for the mixing ratio for the dyestuff, the ratio of 0.05 to 0.2 g of the dyestuff to 14.5 to 17.0 g of the plastic substrate material is suited for achieving the object of coloring the disc for facilitating its visual recognition. Although the dyestuff may be added in a value more than this range according to the application, the plastic substrate itself tends to become mechanically brittle.

BEST MODE FOR CARRYING OUT THE INVENTION

Figure 1:
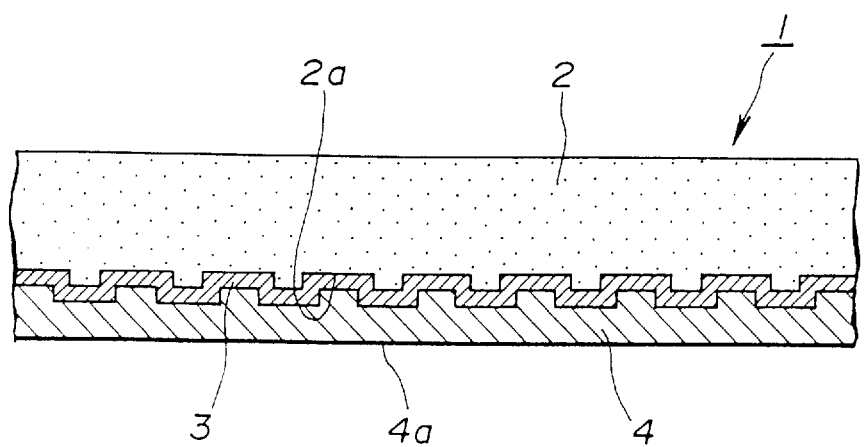
FIG. 1 is a schematic cross-sectional view showing essential portions of the optical disc prepared with the present embodiment.

The present invention is hereinafter explained in detail with reference to illustrative experimental results.
(1) Method for Purifying Dyestuff The dyestuffs were purified by a purification method employing a Soxhlet extractor. A cylindrical filter paper manufactured by TOYO ROSHI CO. LTD. was used as a filter, and a 325-mesh stainless steel screen was also set. The dyestuff was purified using methylene chloride as an extraction solution under repeated refluxing by a mantle heater adjusted to 55° C. for removing impurities and foreign matter. Crystal particles of the purified dyestuff were taken out from the round-bottomed flask and dried at 5° C. for 8 hours for removing methylene chloride for producing a purified dyestuff.

(2) Comminution and Dispersion of Dyestuff Particles

The dyestuff produced by the purification method for the dyestuff (1) was pre-mixed in the plasticizer (acrylic plasticizer) in an optional ratio (weight ratio) and dispersed as the dyestuff particles were comminuted with three rolls. The degree of comminution was set by adjusting the clearance and the number of times the dyestuff was allowed to pass through the rolls. The size of the dispersed particles was measured in accordance with the JIS K5400, 4—4 Method.

(3) Filtration of Paste-Like Coloring Matter

The paste-like coloring matter, obtained on comminution and dispersion of the particles of the dyestuff (2), was filtered through a 200-mesh filter manufactured by TOYO ROSHI CO. LTD.

(4) Coloring Method

A coloring unit was installed at a site where a starting resin material (polycarbonate) was supplied by descent from a hopper mounted at an upper portion of an extruder of a molding device, and a paste-like coloring matter obtained on filtration of the paste-like coloring matter (3) was mixed into the starting resin material. The coloring matter was previously metered in prescribed amounts by a metering unit and injected via a nozzle mounted at a lower portion of the hopper. The injected coloring matter was affixed to the polycarbonate resin of the starting resin material passed through the hopper so as to be introduced into the inside of the extruder.

The polycarbonate resin of the starting resin material, to which the coloring matter was affixed, was passed through a field zone, compression zone and a metering zone in the inside of the extruder and kneaded so as to be injected into the inside of the metal mold as a uniformly colored starting material for injection molding.

(5) Construction of the prepared Optical Disc

Using the injection-molded polycarbonate substrate, an optical disc constructed as shown in FIG. 1 was prepared.

The optical disc 1 was prepared by forming a reflective layer 3 on a polycarbonate substrate 2 having pits 2a in the form of recesses and lands and by forming a protective layer 4 of a UV curable resin thereon. The protective layer 4 has its surface 4a formed as a printed surface.

(6) Evaluation of the Optical Disc

If the dyestuff is mixed for coloring the CD, the polycarbonate is not dissolved and dispersed in polycarbonate, depending upon the particle size of the dyestuff, such that the dyestuff exist as lumps in the form of foreign matter in the polycarbonate substrate. When the data is reproduced from the CD, this foreign matter shields the laser light for inhibiting readout of pits recorded on the signal surface of the CD and hence correct regeneration of digital signals.

For example, if the dyestuff with a larger particle size is present in the substrate, errors as shown in Table 1 are produced in the CD player.

TABLE 1

| conditions | C1 errors (peak value) | C2 errors |
|---|---|---|
| no foreign matter | 15 to 30/second | 0 |
| foreign matter present | 220/second or more | 1 or more (actual number being 105 to 273) |

If, during readout of signals recorded on the CD, signal readout is impeded due to foreign matter or damages, error correction is performed by an error correction circuit provided in the inside of the player. The error correction circuit is configured for correcting random errors mainly by the C1 code of the cross interleave Reed-Solomon code (CIRC) and for correcting the burst error produced by larger defects by the C2 code.

The number of corrected errors during decoding is denoted in the columns C1 and C2 errors specifying the mean value per second and the actual number of errors per second, respectively.

The CD player (trade name: CDP-3000) was remodelled and the number of times of occurrence of the C1 and C2 flags outputted by the CIRC decoder were measured for deriving the values of the C1 and C2 errors.

The samples with no foreign matter (0 Ce-errors) were treated as being satisfactory and evaluation was made based upon the yield of the satisfactory samples.

(7) Illustrative Composition of the Dyestuff

Three sorts of the dyestuff, obtained in accordance with the method described in the purification method for dyestuff (1), were mixed by weight ratios shown in Table 2. Plural samples of the paste-like coloring matter with the maximum particle sizes of 80 μm, 60 μm, 50 μm and 40 μm were produced, using a grind gauge, while the number of times of passage through the three rolls and the clearance were adjusted in accordance with the method described in the comminution and dispersion of dyestuff particles (2).

TABLE 2

| dyestuffs | composition |
|---|---|
| Plastron Red 8350 (anthraquinone based dyestuff produced by ARIMOTO KAGAKU KOGYO CO. LTD.) | 43 wt. parts |
| Mitsui PS Green BH (anthraquinone based dyestuff produced by MITSUI TOATSU SHA) | 55 wt. parts |
| Dia-Resin Yellow F (heterocyclic based dyestuff produced by MITSUBISHI KASEI SHA) | 2 wt. parts |

The samples of the coloring matter, obtained by filtration by the method described in Filtration of the Paste-Like Coloring Matter (3), as samples Nos. 1, 2, 3 and 4, were molded to produce CD substrates in accordance with the method described in Coloring Method (4) above. The molded CDs were pitch-black in color.

Optical disc samples shown in FIG. 1 were produced using respective substrates and evaluated in accordance with the evaluation method described above. It was ascertained that the yields were 40%, 70%, 90% and 95% and a satisfactory yield exceeding 90% could be achieved for the dyestuff particle of not more than 50 μm.

INDUSTRIAL APPLICABILITY

As will be apparent from the foregoing description of the present invention, the sorts and usages etc. of the optical information recording medium can be instantly discerned by admixing the coloring matter into the plastic substrate of the optical information recording medium, such as CD, depending upon the sorts and usage of the optical information recording medium. In addition, by optimizing the particle size of the coloring matter mixed into the plastic substrate, satisfactory optical characteristics may also be achieved.

We claim:

1. An optical information recording medium comprising:
   a plastic substrate colored by admixture of coloring matter; and
   a signal recording portion from which information signals are optically read out,
   wherein particles of the coloring matter admixed into said plastic substrate are not more than 50 $\mu$m in diameter.

2. The information recording medium as claimed in claim 1 wherein said signal recording portion comprises pits in the form of recesses and lands formed on said plastic substrate and a reflective layer formed thereon.

3. The information recording medium as claimed in claim 1 wherein said plastic substrate is formed of polycarbonate.

4. The information recording medium as claimed in claim 1 wherein said coloring matter is a dyestuff.

5. A method for producing an optical information recording medium comprising the steps of:
   dispersing coloring matter in a dispersion medium to produce a liquid coloring matter;
   passing said liquid coloring matter through a filter for removing coarse particles therefrom for preparing the liquid coloring matter with the maximum particle diameter of the coloring matter being not more than 50 $\mu$m; and
   supplying said liquid coloring matter into a resin injection hopper of an injection molding device for injection molding a plastic substrate.

* * * * *